(12) United States Patent
Wang (10) Patent No.: US 12,431,750 B2
(45) Date of Patent: Sep. 30, 2025

(54) OUTER ROTOR OF PERMANENT MAGNET ASSISTED SYNCHRONOUS RELUCTANCE MOTOR AND PERMANENT MAGNET SYNCHRONOUS MOTOR COMPRISING THE SAME

(71) Applicant: Zhongshan Broad-Ocean Motor Co., Ltd., Zhongshan (CN)

(72) Inventor: Min Wang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 266 days.

(21) Appl. No.: 18/223,518

(22) Filed: Jul. 18, 2023

(65) Prior Publication Data

US 2024/0171026 A1 May 23, 2024

(30) Foreign Application Priority Data

Nov. 23, 2022 (CN) .......................... 202211469748.7

(51) Int. Cl.
*H02K 1/279* (2022.01)
*H02K 1/24* (2006.01)
(Continued)

(52) U.S. Cl.
CPC ............. *H02K 1/279* (2022.01); *H02K 1/246* (2013.01); *H02K 1/2791* (2022.01);
(Continued)

(58) Field of Classification Search
CPC ...... H02K 1/246; H02K 1/2789; H02K 1/279; H02K 1/2791; H02K 21/22; H02K 21/029
(Continued)

(56) References Cited

U.S. PATENT DOCUMENTS

| 2015/0115758 A1* | 4/2015 | Koka | ..................... H02K 21/14 |
| | | | 318/139 |
| 2016/0164386 A1* | 6/2016 | Kusase | .................. H02K 16/04 |
| | | | 310/156.01 |

(Continued)

FOREIGN PATENT DOCUMENTS

| CN | 103855815 A | 6/2014 |
| CN | 104600939 A | 5/2015 |

(Continued)

*Primary Examiner* — Oluseye Iwarere
*Assistant Examiner* — Daniel K Schlak
(74) *Attorney, Agent, or Firm* — MATTHIAS SCHOLL P.C.; Matthias Scholl (57) ABSTRACT

An outer rotor of a permanent magnet assisted synchronous reluctance motor includes an annular rotor core and a plurality of permanent magnets; the annular rotor core includes a central hole; the annular rotor core further includes a plurality of slots, and the plurality of permanent magnets are disposed in the plurality of slots and form a plurality of magnetic poles along the circumferential direction of the rotor core. Each magnetic pole includes three shapes of permanent magnet: a first arc-shaped permanent magnet concentric with the rotor core, a second arc-shaped permanent magnet not concentric with the rotor core, and a rectangular permanent magnet. In each magnetic pole, the three shapes of permanent magnet are symmetrically arranged along the center line of the magnetic pole, and the first arc-shaped permanent magnet, the second arc-shaped permanent magnet and the rectangular permanent magnet are sequentially spaced radially from inside to outside.

11 Claims, 14 Drawing Sheets

(51) Int. Cl.
  *H02K 1/2789* (2022.01)
  *H02K 1/2791* (2022.01)
  *H02K 21/22* (2006.01)

(52) U.S. Cl.
  CPC .......... *H02K 1/2789* (2022.01); *H02K 21/22* (2013.01); *H02K 2213/03* (2013.01)

(58) Field of Classification Search
  USPC ................................. 310/56, 156.53, 156.56
  See application file for complete search history.

(56) References Cited

U.S. PATENT DOCUMENTS

| | | | |
|---|---|---|---|
| 2017/0033624 A1* | 2/2017 | Kikuchi | B60L 15/007 |
| 2017/0250584 A1* | 8/2017 | Lambert | H02K 3/18 |
| 2018/0233974 A1* | 8/2018 | Shi | B60L 50/00 |
| 2021/0265882 A1* | 8/2021 | Mitsuda | H02K 16/02 |
| 2022/0368183 A1* | 11/2022 | Reffo | H02K 1/279 |
| 2023/0170772 A1* | 6/2023 | Coppola | H02K 15/028 |
| 2023/0179043 A1* | 6/2023 | Kitao | H02K 1/2766 310/156.56 |
| 2023/0253841 A1* | 8/2023 | Kiraly | H02K 1/2766 310/156.56 |
| 2024/0128816 A1* | 4/2024 | Lai | H02K 21/14 |

FOREIGN PATENT DOCUMENTS

| | | | | |
|---|---|---|---|---|
| CN | 108418373 A | * | 8/2018 | .............. H02K 19/12 |
| CN | 211127514 U | * | 7/2020 | .............. H02K 21/02 |
| CN | 112953152 A | * | 6/2021 | .............. H02K 1/146 |
| CN | 113497503 A | * | 10/2021 | ................ H02K 1/30 |
| CN | 113972765 A | * | 1/2022 | .............. H02K 1/187 |
| CN | 215956144 U | * | 3/2022 | .............. H02K 1/279 |
| CN | 115276358 A | * | 11/2022 | .............. H02K 15/50 |
| EP | 3675329 A1 | | 7/2020 | |
| JP | 2003102144 A | | 4/2003 | |

* cited by examiner

OUTER ROTOR OF PERMANENT MAGNET ASSISTED SYNCHRONOUS RELUCTANCE MOTOR AND PERMANENT MAGNET SYNCHRONOUS MOTOR COMPRISING THE SAME

CROSS-REFERENCE TO RELATED APPLICATIONS

Pursuant to 35 U.S.C. § 119 and the Paris Convention Treaty, this application claims foreign priority to Chinese Patent Application No. 202211469748.7 filed Nov. 23, 2022, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to an outer rotor of a permanent magnet assisted synchronous reluctance motor (PMaSynRM) and a permanent magnet synchronous motor comprising the same.

The rotors of conventional permanent magnet assisted motors generally include 2 or 3 layers of arc-shaped or U-shaped permanent magnet and slots accommodating the permanent magnet. Due to the large number of rotor layers and the arc-shaped or U-shaped permanent magnet and slots, the rotor occupies more space of the motor in the diameter direction (i.e., has a larger thickness). When the radial size of the motor is fixed, the space of the motor stator is inevitably occupied, resulting in a smaller outer diameter of the stator and a smaller area of the stator slot, thereby affecting the electrical load of the stator and reducing the motor load. In addition, the permanent magnet has high magnetic leakage, a narrow magnetic flux path and low reluctance torque.

SUMMARY

The disclosure provides an outer rotor of a permanent magnet assisted synchronous reluctance motor (PMaSynRM). The outer rotor comprises an annular rotor core and a plurality of permanent magnet; the annular rotor core comprises a central hole; the annular rotor core further comprises a plurality of slots, and the plurality of permanent magnets are disposed in the plurality of slots and form a plurality of magnetic poles along a circumferential direction of the rotor core; each magnetic pole comprises three shapes of permanent magnet: a first arc-shaped permanent magnet concentric with the rotor core and having a uniform thickness, a second arc-shaped permanent magnet not concentric with the rotor core, and a rectangular permanent magnet; in each magnetic pole, the three shapes of permanent magnet are symmetrically arranged along a center line L of the magnetic pole, and the first arc-shaped permanent magnet, the second arc-shaped permanent magnet and the rectangular permanent magnet are sequentially spaced radially from inside to outside; an inner arc-shaped surface of the first arc-shaped permanent magnet and an inner circular sidewall of the rotor core are of equal radius and form a flush structure; one magnetic pole comprises at least three first arc-shaped permanent magnets, one second arc-shaped permanent magnet, and two rectangular permanent magnets; the at least three first arc-shaped permanent magnets are arranged at intervals along the circumferential direction of the rotor core, and a magnetic channel is formed between every two adjacent first arc-shaped permanent magnets; the second arc-shaped permanent magnet is located between the at least three first arc-shaped permanent magnets and the rectangular permanent magnet, and the second arc-shaped permanent magnet is not in contact with the inner circular sidewall and outer circular sidewall of the rotor core; and an inner arc surface of the second arc-shaped permanent magnet covers at least one first arc-shaped permanent magnet and at least two magnetic channels.

In a class of this embodiment, each magnetic pole has a central angle $\alpha 3$, $\alpha 3 = 360°/2P$, where P is a number of pairs of the magnetic poles on the rotor core; $1.5*\alpha 3 > \alpha 1 > 0.5*\alpha 3$, and $1.5*\alpha 3 < \alpha 2 < 3*\alpha 3$, where $\alpha 1$ is an included angle between the center line L of the magnetic pole and the rectangular permanent magnet, and $\alpha 2$ is a central angle of the second arc-shaped permanent magnet.

In a class of this embodiment, the included angle $\alpha 1$ between the center line L of the magnetic pole and the rectangular permanent magnet is less than 90°, and the central angle $\alpha 2$ of the second arc-shaped permanent magnet is $45° < \alpha 2 < 180°$.

In a class of this embodiment, the first arc-shaped permanent magnets are three or four in number.

In a class of this embodiment, the first arc-shaped permanent magnets have a thickness d, and the rotor core has a thickness D, where $0.16*D < d < 0.3*D$; a distance between two adjacent first arc-shaped permanent magnets is L1, and $0.15*D < L1 < 0.35*D$.

In a class of this embodiment, a minimum distance between the second arc-shaped permanent magnet and the outer circular sidewall of the rotor core is L2, and $0.15*D < L2 < 0.35*D$.

In a class of this embodiment, a minimum distance between the rectangular permanent magnet and the second arc-shaped permanent magnet is L3, and $0.15*D < L3 < 0.35*D$.

In a class of this embodiment, the rotor core further comprises first auxiliary slots on both ends of the rectangular permanent magnet; a first narrow magnetic bridge is formed between one first auxiliary slot and the outer circular sidewall to reduce magnetic leakage; the rotor core further comprises second auxiliary slots on both ends of the second arc-shaped permanent magnet; a second narrow magnetic bridge is formed between one second auxiliary slot and an outer arc surface of the first arc-shaped permanent magnets to reduce magnetic leakage; and both the first auxiliary slots and the second auxiliary slots are filled with non-magnetic permeable materials.

In a class of this embodiment, the second arc-shaped permanent magnet has a uniform thickness or is thick in the middle and thin at both ends.

In a class of this embodiment, the first arc-shaped permanent magnet, the second arc-shaped permanent magnet, and the rectangular permanent magnet all comprise ferrite material; or, the first arc-shaped permanent magnet comprises neodymium iron boron material, and the second arc-shaped permanent magnet and the rectangular permanent magnet both comprise ferrite material.

In another aspect, the disclosure provides a permanent magnet synchronous motor, comprising a stator assembly and the above-mentioned permanent magnet outer rotor.

The following advantages are associated with the outer rotor of a permanent magnet assisted synchronous reluctance motor (PMaSynRM) and the permanent magnet synchronous motor comprising the same of the disclosure:

The first arc-shaped permanent magnet in the inner layer is a surface mount structure, while the outer layer is a built-in rectangular permanent magnet that forms a magnetic reluctance slot with the help of air outside the motor, and together with the second arc-shaped permanent magnet in the middle, a three-layer magnetic resistance slot is formed, which takes up less radial space and effectively utilizes the magnetic reluctance torque. In addition, the rotor space is effectively utilized, and a large amount of permanent magnet is filled to reduce magnetic leakage and generate strong permanent magnet torque, thereby increasing the motor torque density and improving motor Performance.

DETAILED DESCRIPTION

To further illustrate the disclosure, embodiments detailing an outer rotor of a permanent magnet assisted synchronous reluctance motor are described below. It should be noted that the following embodiments are intended to describe and not to limit the disclosure.

Example 1

As shown in FIGS. 1-10, the example provides an outer rotor of a permanent magnet assisted synchronous reluctance motor (PMaSynRM). The outer rotor comprising: an annular rotor core 1 and a plurality of permanent magnets 2; the annular rotor core 1 comprises a central hole 11; the annular rotor core 1 further comprises a plurality of slots 12, and the plurality of permanent magnets 2 are disposed in the plurality of slots 12 and form a plurality of magnetic poles 100 along a circumferential direction of the rotor core 1; each magnetic pole comprises three shapes of permanent magnet 2: a first arc-shaped permanent magnet 2a concentric with the rotor core 1 and having a uniform thickness, a second arc-shaped permanent magnet 2b not concentric with the rotor core 1, and a rectangular permanent magnet 2c; in each magnetic pole, the three shapes pf permanent magnet 2 are symmetrically arranged along a center line L of the magnetic pole 100, and the first arc-shaped permanent magnet 2a, the second arc-shaped permanent magnet 2b and the rectangular permanent magnet 2c are sequentially spaced radially from inside to outside; an inner arc-shaped surface 2a1 of the first arc-shaped permanent magnet 2a and an inner circular sidewall 13 of the rotor core 1 are of equal radius and form a flush structure; one magnetic pole 100 comprises at least three first arc-shaped permanent magnets 2a, one second arc-shaped permanent magnet 2b, and two rectangular permanent magnets 2c; the at least three first arc-shaped permanent magnets 2a are arranged at intervals along the circumferential direction of the rotor core, and a magnetic channel 14 is formed between every two adjacent first arc-shaped permanent magnets 2a; the second arc-shaped permanent magnet 2b is located between the at least three first arc-shaped permanent magnets 2a and the rectangular permanent magnet 2c, and the second arc-shaped permanent magnet 2b is not in contact with the inner circular sidewall 13 and outer circular sidewall 15 of the rotor core 1; and an inner arc surface 2b1 of the second arc-shaped permanent magnet 2b covers at least one first arc-shaped permanent magnet 2a and at least two magnetic channels 14. The first arc-shaped permanent magnet in the inner layer is a surface mount structure, while the outer layer is a built-in rectangular permanent magnet that forms a magnetic reluctance slot with the help of air outside the motor, and together with the second arc-shaped permanent magnet in the middle, a three-layer magnetic resistance slot is formed, which takes up less radial space and effectively utilizes the magnetic reluctance torque. In addition, the rotor space is effectively utilized, and a large amount of permanent magnet is filled to reduce magnetic leakage and generate strong permanent magnet torque, thereby increasing the motor torque density and improving motor performance.

Figure 1:
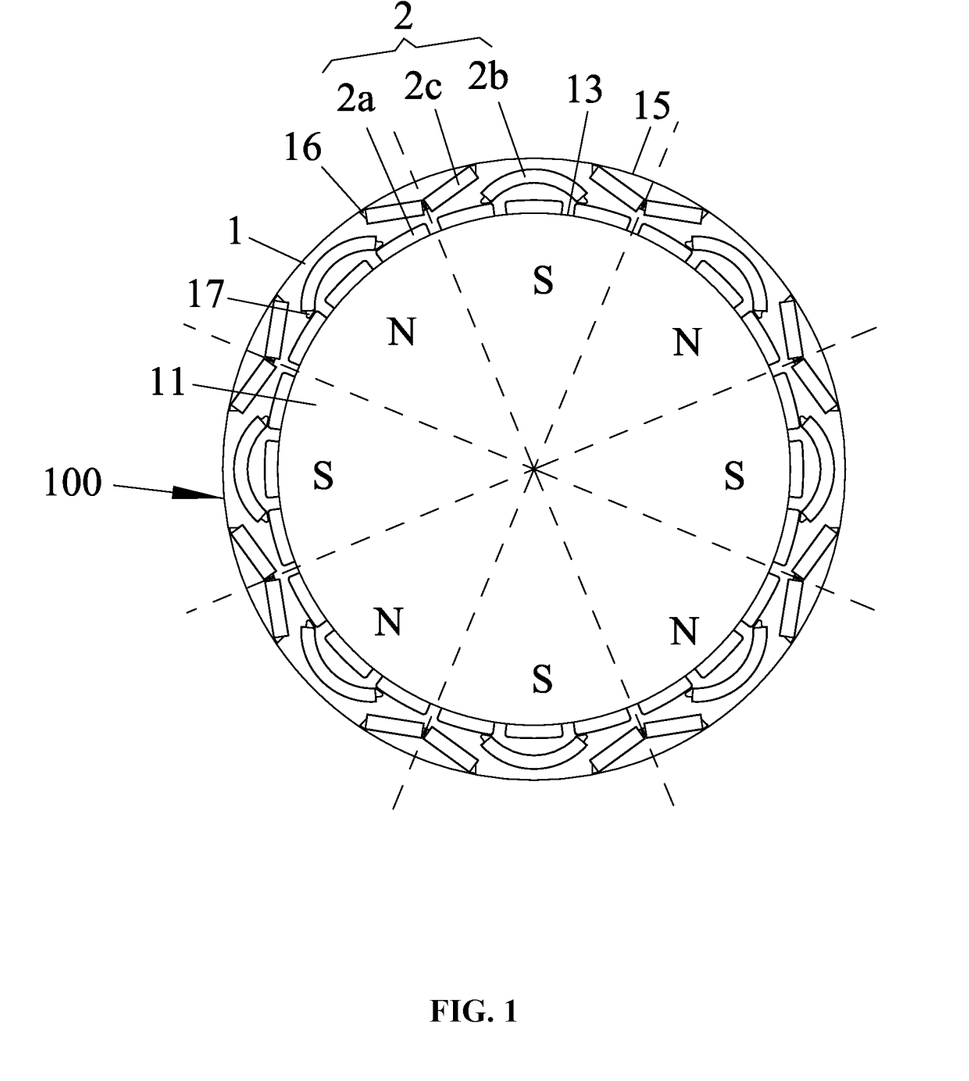
FIG. 1 is a schematic diagram of an outer rotor core and permanent magnets in Example 1 of the disclosure.
Figure 2:
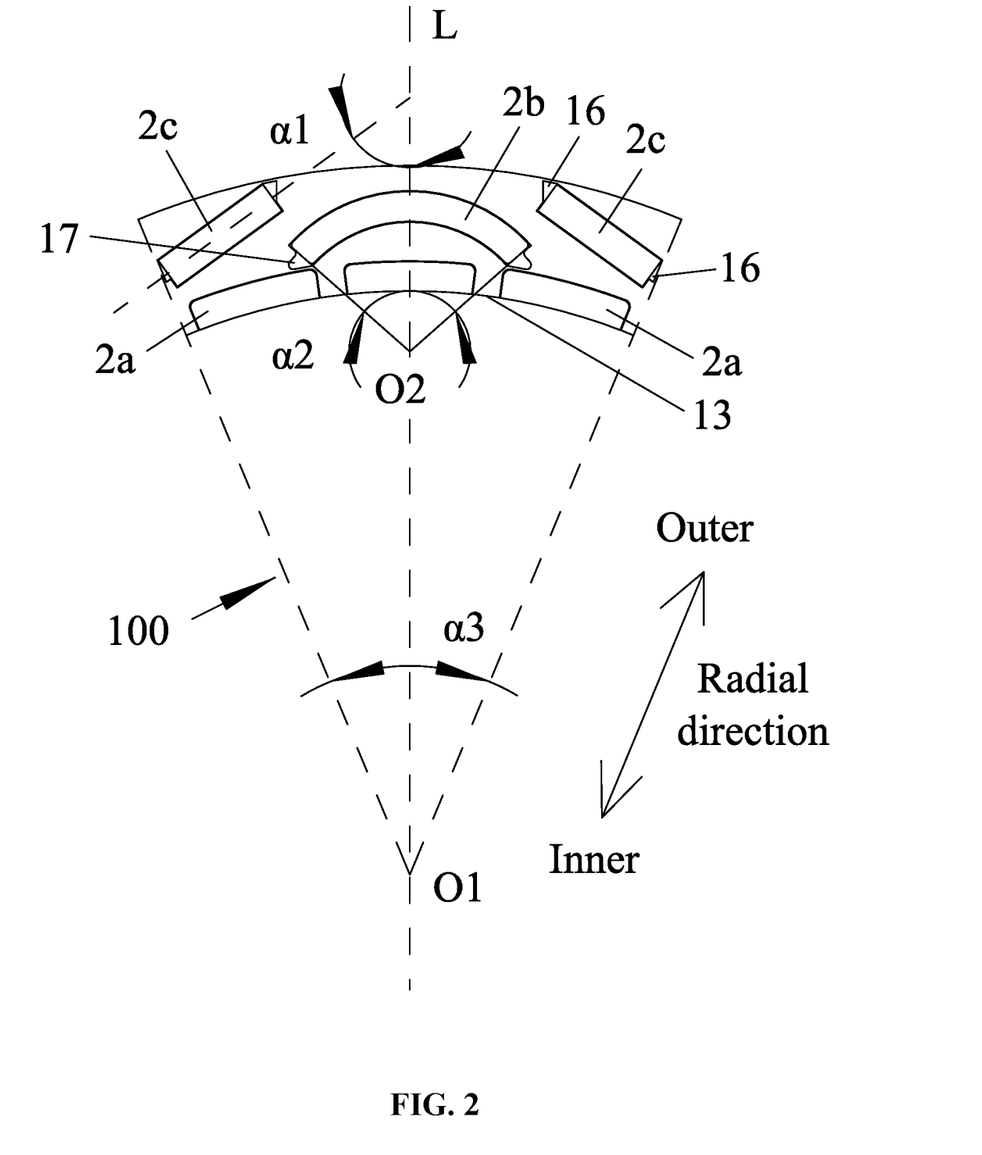
FIG. 2 is a schematic diagram of a single magnetic pole in Example 1 of the disclosure.

Each magnetic pole has a central angle α3, α3=360°/2P, where P is a number of pairs of the magnetic poles on the rotor core 1; 1.5*α3>α1>0.5*α3, and 1.5*α3<α2<3*α3, where α1 is an included angle between the center line L of the magnetic pole and the rectangular permanent magnet 2c, and α2 is a central angle of the second arc-shaped permanent magnet 2b. The structure design is reasonable, effectively utilizing the rotor space, with small radial space occupation, thereby improving the torque density and performance of the motor.

The included angle α1 between the center line L of the magnetic pole and the rectangular permanent magnet 2c is less than 90°, and the central angle α2 of the second arc-shaped permanent magnet is 45°<α2<180°. The structure design is reasonable, effectively utilizing the rotor space, with small radial space occupation, thereby improving the torque density and performance of the motor.

The first arc-shaped permanent magnets 2a are three in number. The inner arc surface 2b1 of the arc-shaped permanent magnet 2b covers one first arc-shaped permanent magnet 2a and two magnetic channels 14.

Figure 5:
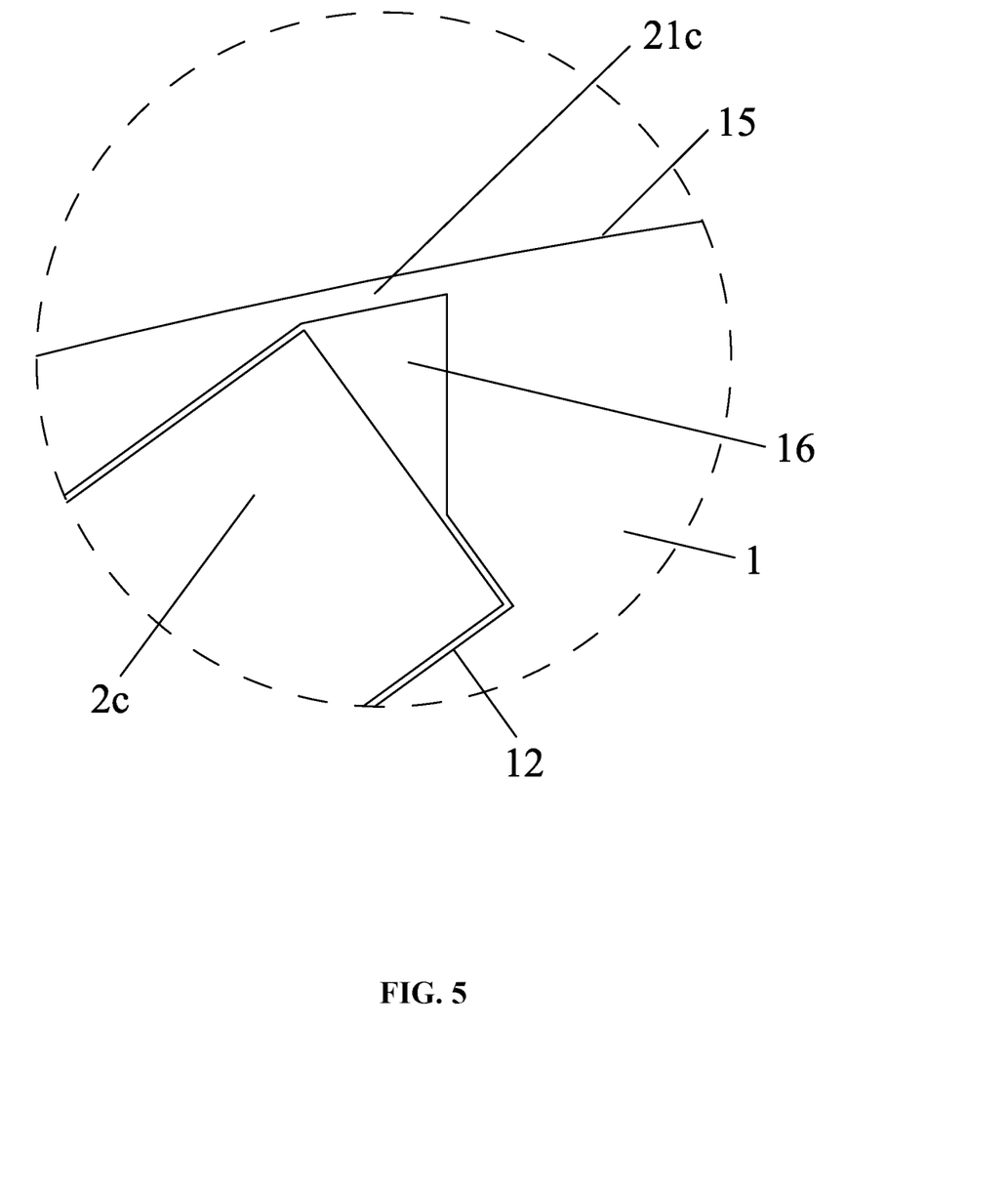
FIG. 5 is a local enlarged view of part A in FIG. 4.

The first arc-shaped permanent magnets 2a have a thickness d, and the rotor core 1 has a thickness D, where 0.16*D<d<0.3*D; a distance between two adjacent first arc-shaped permanent magnets 2a is L1, and 0.15*D<L1<0.35*D. The structure design is reasonable, which can ensure a smooth magnetic path between the two adjacent first arc-shaped permanent magnets 2a, and also improve the torque density of the motor, effectively utilizing the rotor space and occupying small radial space.

Figure 6:
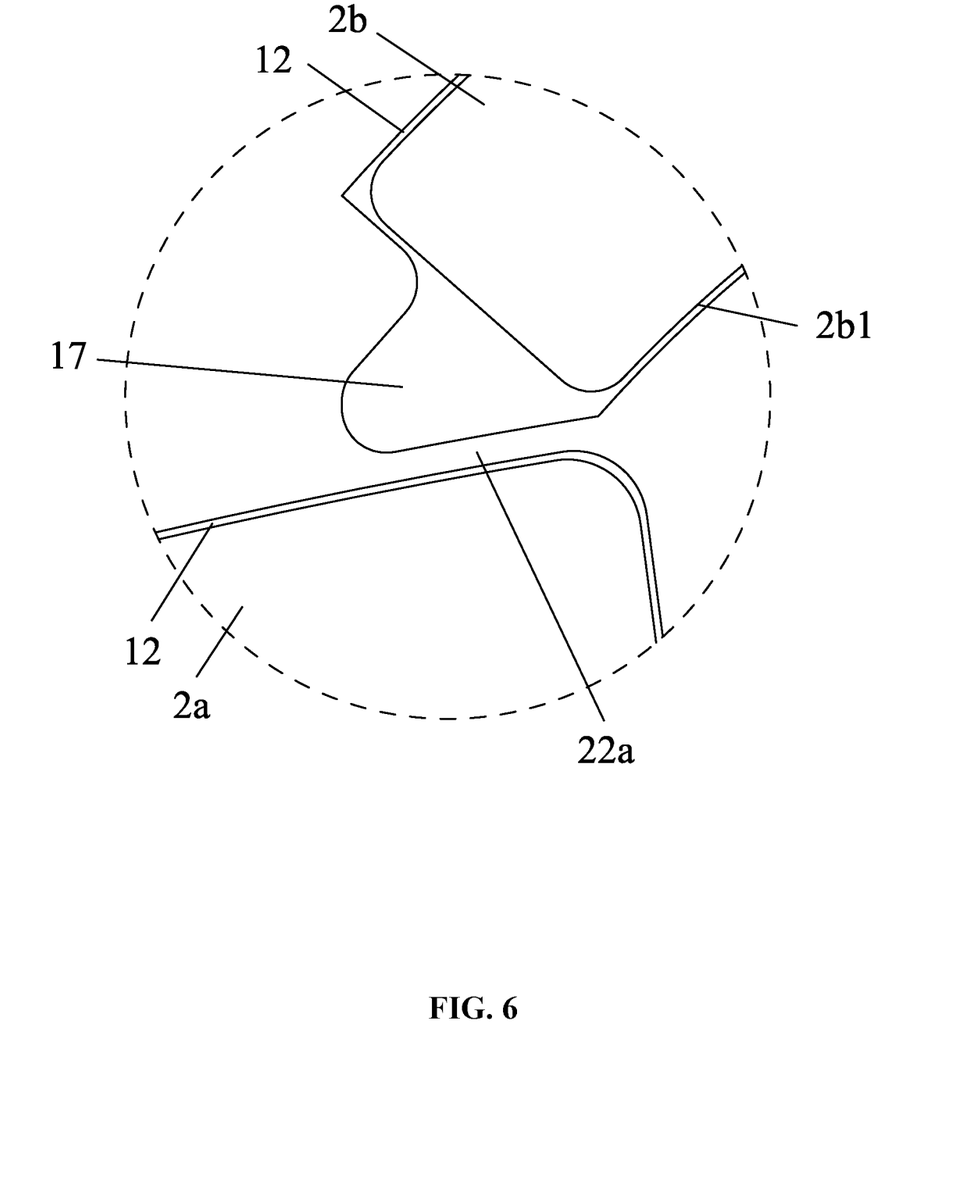
FIG. 6 is a local enlarged view of part B in FIG. 4.

The minimum distance between the second arc-shaped permanent magnet 2b and the outer circular sidewall 15 of the rotor core 1 is L2, and 0.15*D<L2<0.35*D. The structure design is reasonable, which can ensure a smooth magnetic path between the second arc-shaped permanent magnet 2b and the outer arc of the outer rotor core 1, as well as improve the motor torque density, effectively utilizing the rotor space and occupying less radial space.

Figure 7:
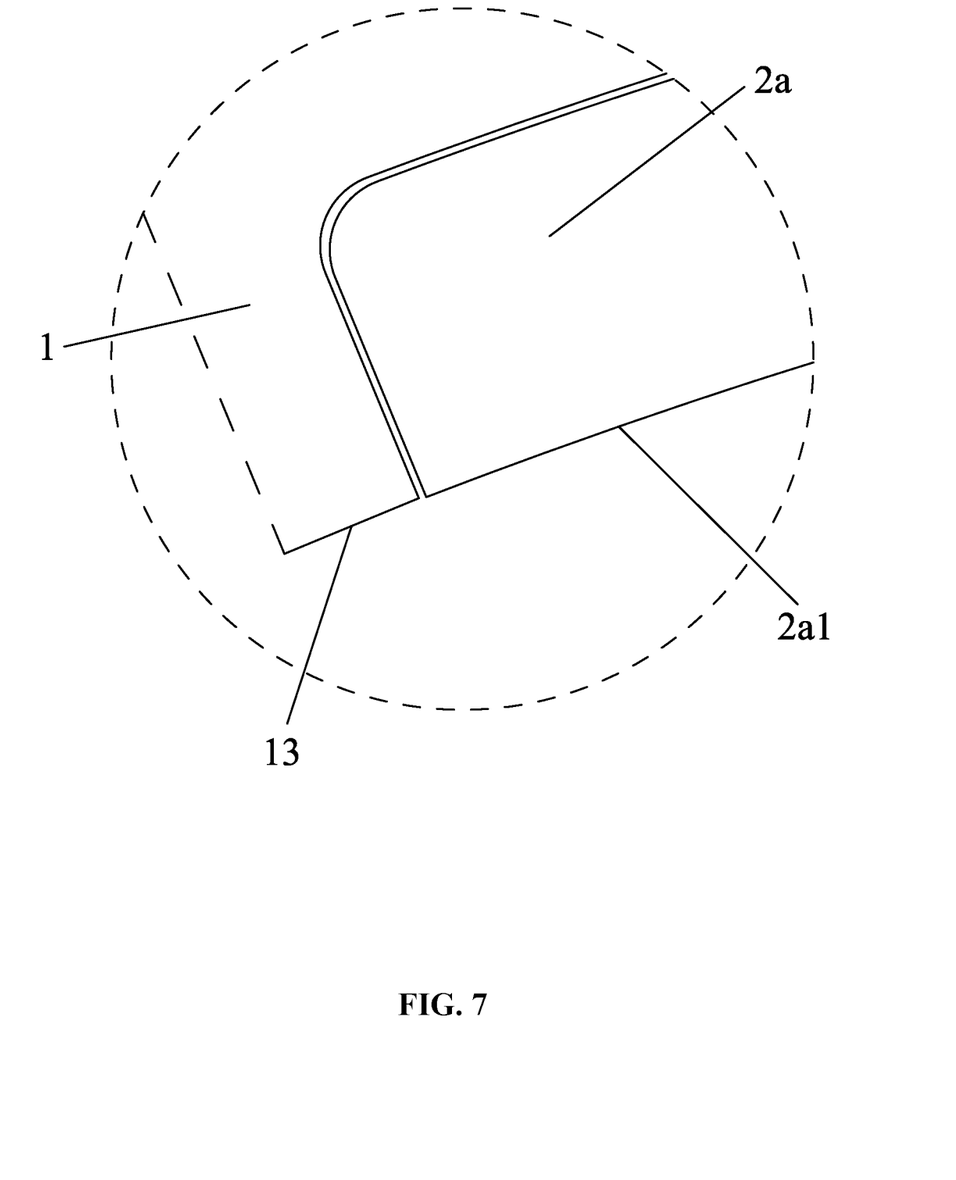
FIG. 7 is a local enlarged view of part C in FIG. 4.
Figure 8:
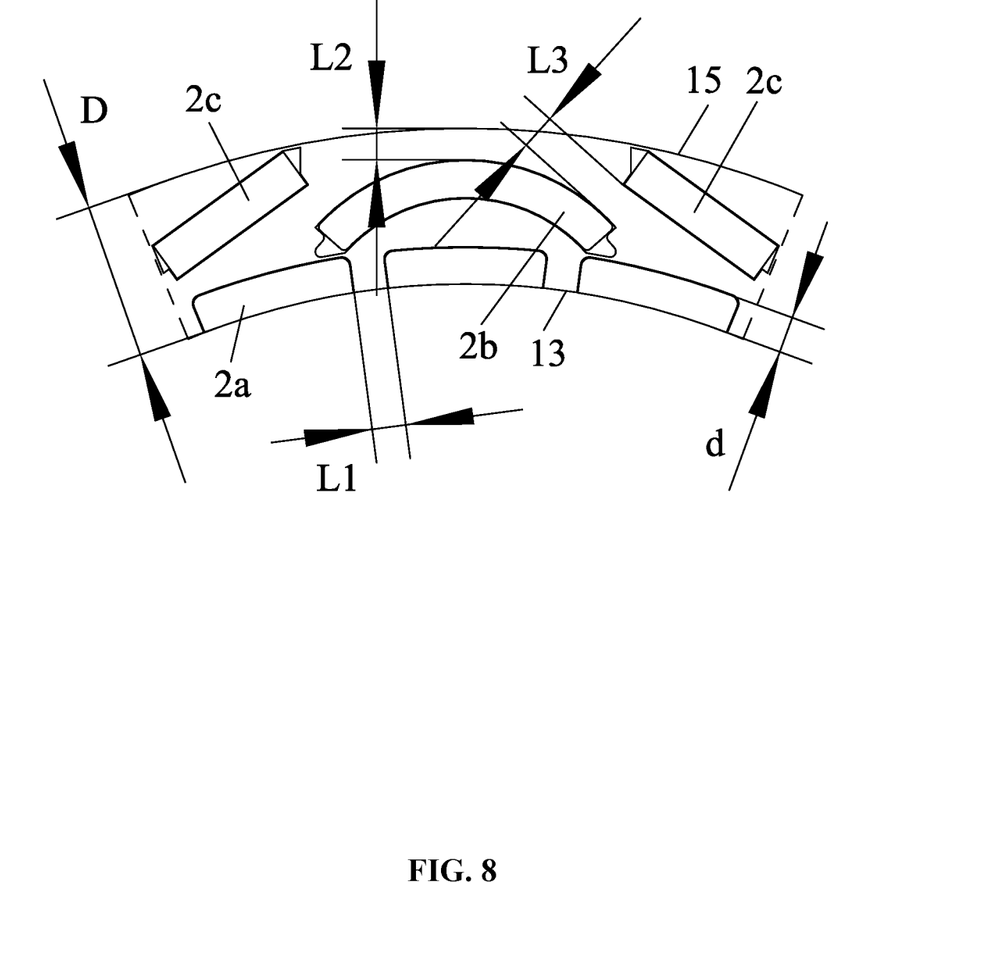
FIG. 8 is a partial structure diagram of an outer rotor core and permanent magnets of a single magnetic pole in Example 1 of the disclosure.

The minimum distance between the rectangular permanent magnet 2c and the second arc-shaped permanent magnet 2b is L3, and 0.15*D<L3<0.35*D.

The structure design is reasonable, which can ensure a smooth magnetic path between the rectangular permanent magnet 2c and the first arc-shaped permanent magnet 2a, as well as improve the motor torque density, effectively utilizing rotor space and occupying small radial space.

Figure 3:
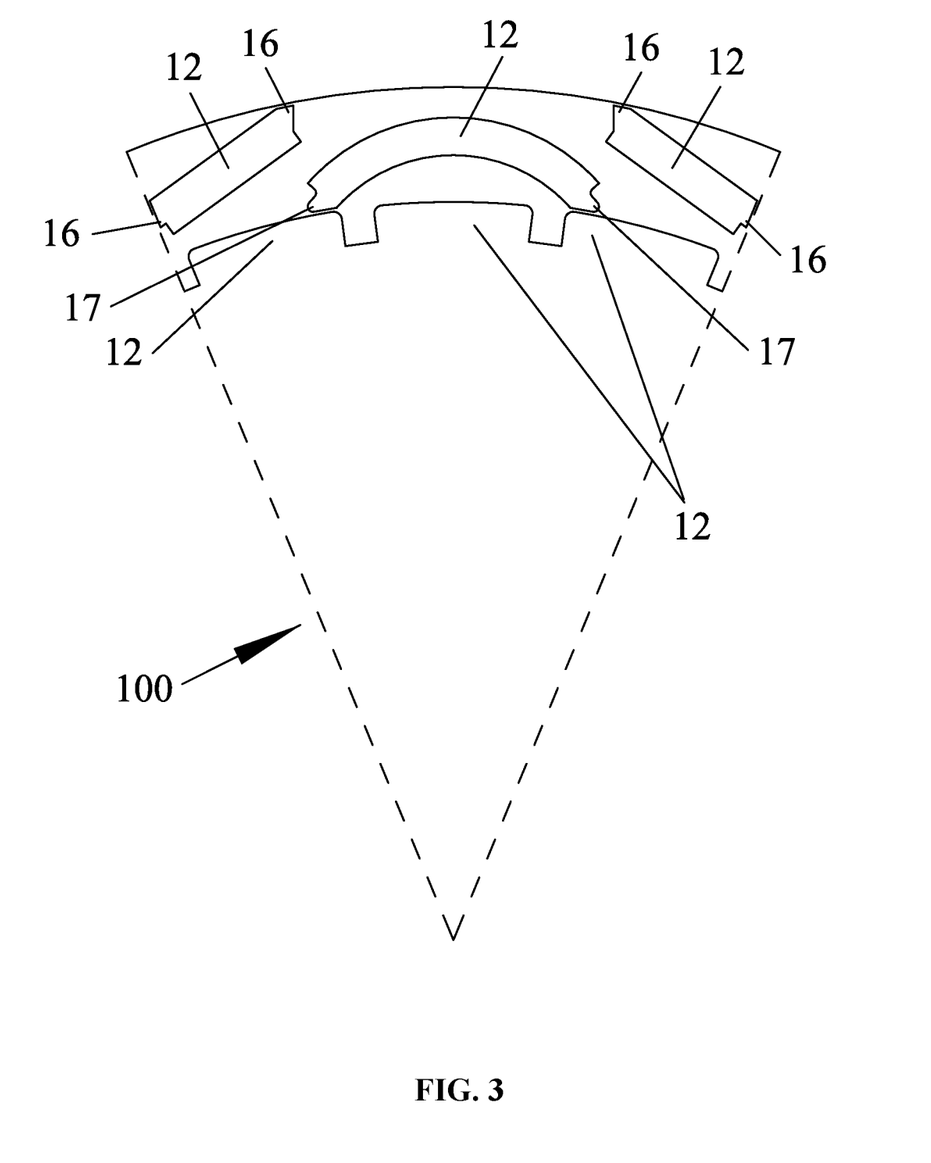
FIG. 3 is a partial structure diagram of an outer rotor core of a single magnetic pole in Example 1 of the disclosure.
Figure 4:
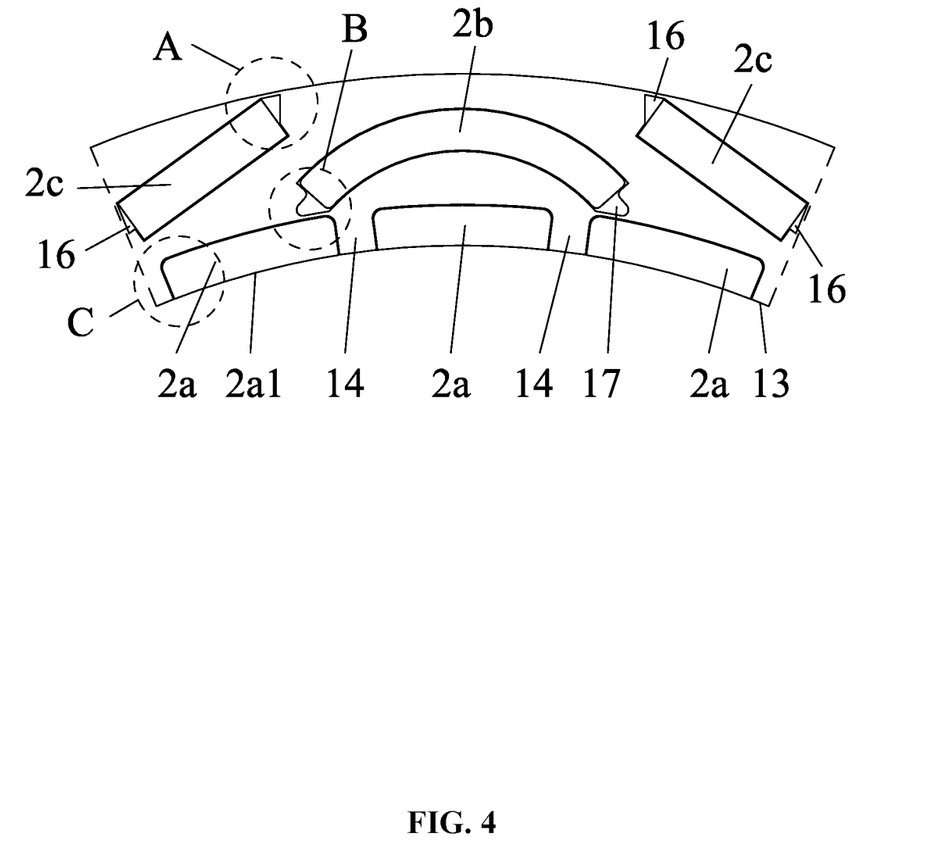
FIG. 4 is a partial structure diagram of an outer rotor core and permanent magnets of a single magnetic pole in Example 1 of the disclosure.

The rotor core 1 further comprises first auxiliary slots 16 on both ends of the rectangular permanent magnet 2c; a first narrow magnetic bridge 21c is formed between one first auxiliary slot 16 and the outer circular sidewall 15 to reduce magnetic leakage; the rotor core 1 further comprises second auxiliary slots 17 on both ends of the second arc-shaped permanent magnet 2b; a second narrow magnetic bridge 22a is formed between one second auxiliary slot 17 and an outer arc surface of the first arc-shaped permanent magnets 2a to reduce magnetic leakage; and both the first auxiliary slots 16 and the second auxiliary slots 17 are filled with non-magnetic permeable materials. The design can generate strong permanent magnet torque, thereby increasing motor torque density and improving motor performance.

The second arc-shaped permanent magnet 2b has a uniform thickness or is thick in the middle and thin at both ends.

The first arc-shaped permanent magnet 2a, the second arc-shaped permanent magnet 2b, and the rectangular permanent magnet 2c all comprise ferrite material; or, the first arc-shaped permanent magnet 2a comprises neodymium iron boron material, and the second arc-shaped permanent magnet 2b and the rectangular permanent magnet 2c both comprise ferrite material.

As shown in FIG. 2, the center of the inner arc-shaped surface 2a1 of the first arc-shaped permanent magnet 2a is O1, and the center of the inner circle of the rotor core 1 is also O1. The inner arc-shaped surface 2a1 of the first arc-shaped permanent magnet 2a and the inner circle sidewall 13 of the rotor core 1 are of the same radius, forming a flush structure. The center of the second arc-shaped permanent magnet 2b is O2, which is not set at the same center as the rotor core 1. As shown in FIGS. 2 and 4, under the same magnetic pole 100, there are three first arc-shaped permanent magnets 2a, one second arc-shape permanent magnet 2b, and two rectangular permanent magnets 2c. The three first arc-shaped permanent magnets 2a are arranged in circumferential intervals, and a magnetic channel 14 is formed between every two adjacent first arc-shaped permanent magnets 2a. The inner arc surface 2b1 of the arc-shaped permanent magnet 2b covers the first arc-shaped permanent magnet 2a in the middle and two magnetic channels 14 on both sides of the first arc-shaped permanent magnet 2a in the middle.

Figure 9:
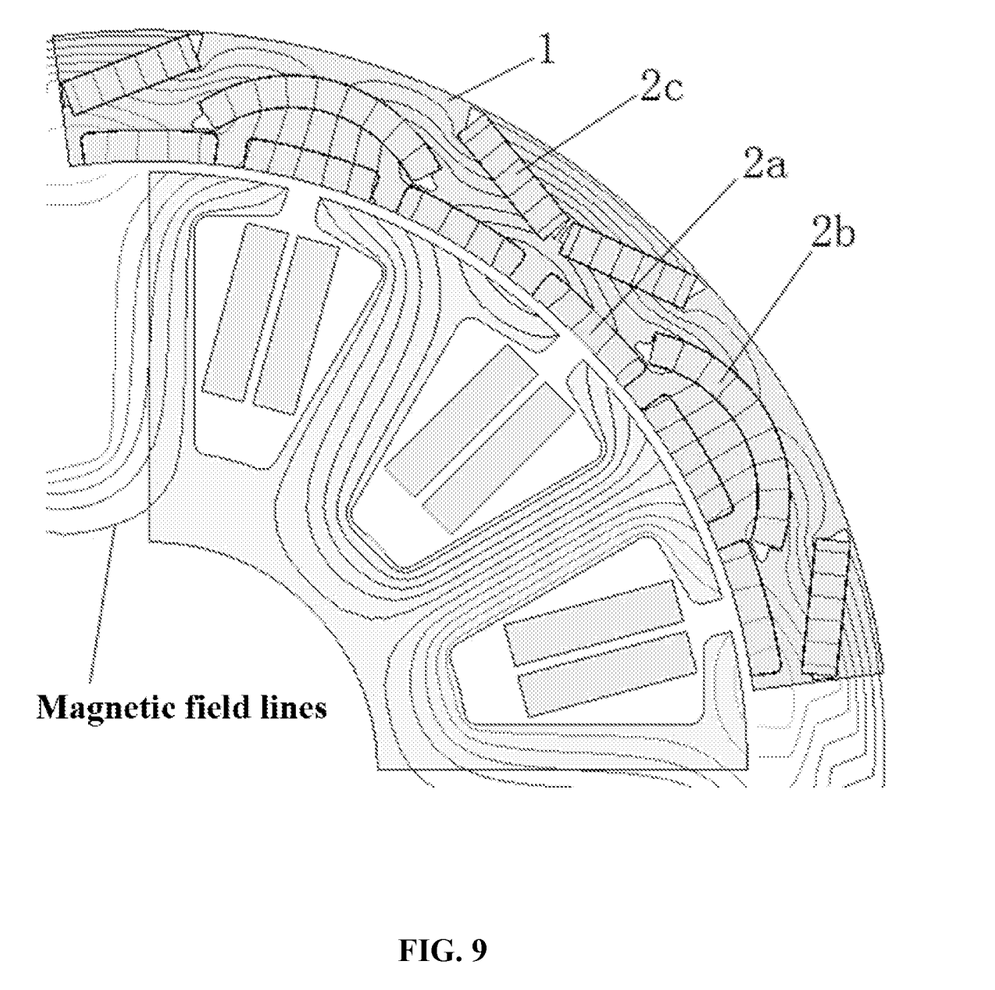
FIG. 9 is a magnetic field line distribution of a magnetic pole in Example 1 of the disclosure.
Figure 10:
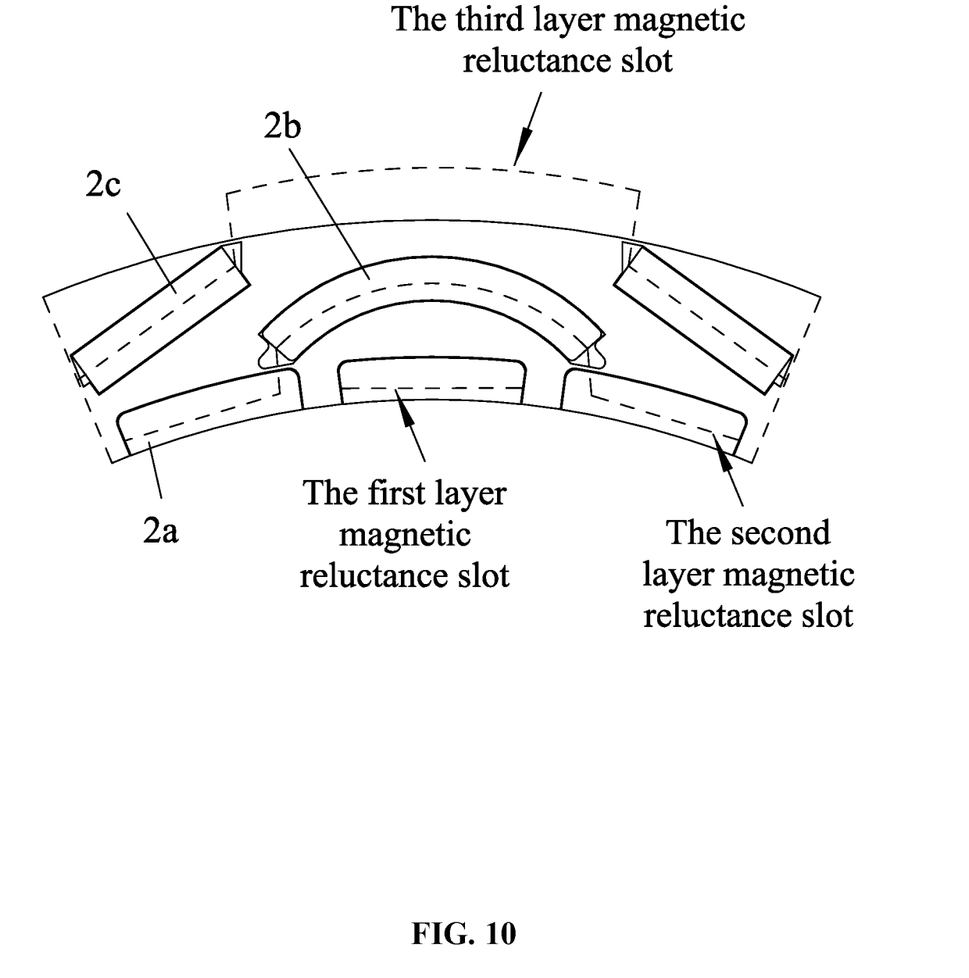
FIG. 10 is a schematic diagram of a three-layer magnetic reluctance slot formed by permanent magnet of a single magnetic pole in Example 1 of the disclosure.

FIG. 9 is a schematic diagram of the distribution of magnetic field lines at the magnetic poles of the disclosure. FIG. 10 is a schematic diagram of a three-layer magnetic reluctance slot formed by permanent magnet of a single magnetic pole. From the figure, it is known that the first arc-shaped permanent magnet 2a located in the middle of the inner layer forms the first layer of magnetic reluctance slot, and the first arc-shaped permanent magnet 2a and the second arc-shaped permanent magnet 2b located on both sides of the inner layer form the second layer of magnetic reluctance slot; the built-in rectangular permanent magnet 2c located on the outer layer forms the third layer of magnetic reluctance slot with the help of air outside the motor.

The design principle of the disclosure is as follows: (1) The rotor of the disclosure comprises three layers of permanent magnet, where the inner layer is a semi surface sticking structure, that is, the inner arc-shaped surface 2a1 of the first arc-shaped permanent magnet 2a and the inner circular sidewall 13 of the rotor core 1 are of equal radius and form a flush structure, which basically does not occupy the radial space of the motor; the outer layer uses air outside the motor for magnetic isolation, that is, the built-in rectangular permanent magnet 2c in the outer layer forms a third layer of magnetic reluctance slot with the help of air outside the motor, and does not occupy radial space. Compared with the traditional permanent magnet assisted outer rotor structure, the structure of the disclosure saves a lot of radial space of the motor and provides more design space for the motor stator. (2) The permanent magnet of the rotor comprises three layers, comprising a first arc-shaped permanent magnet 2a that is concentric and equally thick with the rotor core 1, a second arc-shaped permanent magnet 2b that is not concentric with the rotor core 1, and a rectangular permanent magnet 2c. The first arc-shaped permanent magnet 2a, the second arc-shaped permanent magnet 2b, and the rectangular permanent magnet 2c are arranged radially from inside out in sequence, resulting in a large inductance difference between the d and q axes of the rotor, and a significant reluctance torque generated by the motor, which is beneficial to improving the torque density of the motor; (3) in the case of high torque density requirements for motors, some permanent magnet in the motor can be replaced with high-performance permanent magnet materials to improve motor performance.

Example 2

Figure 11:
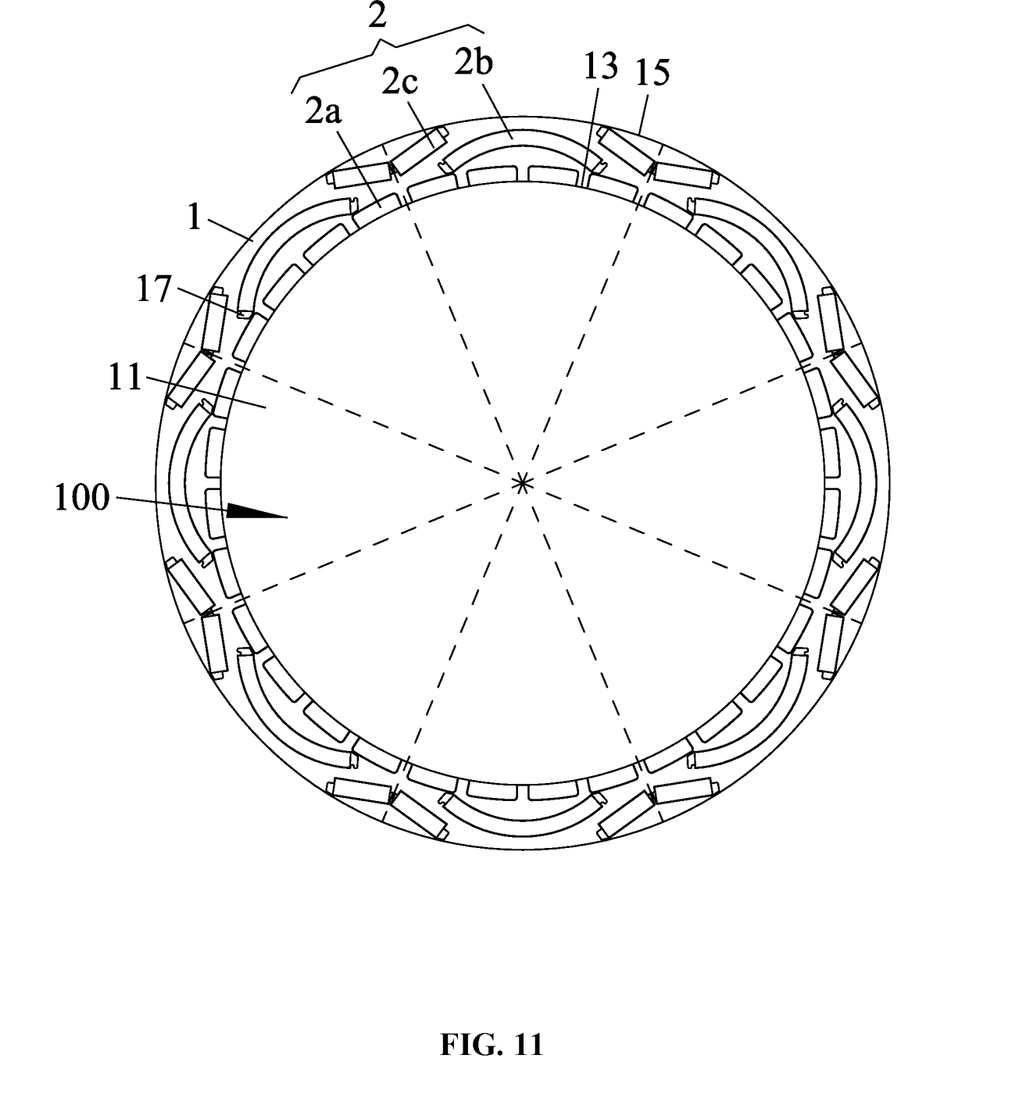
FIG. 11 is a schematic diagram of an outer rotor core and permanent magnets in Example 2 of the disclosure.
Figure 12:
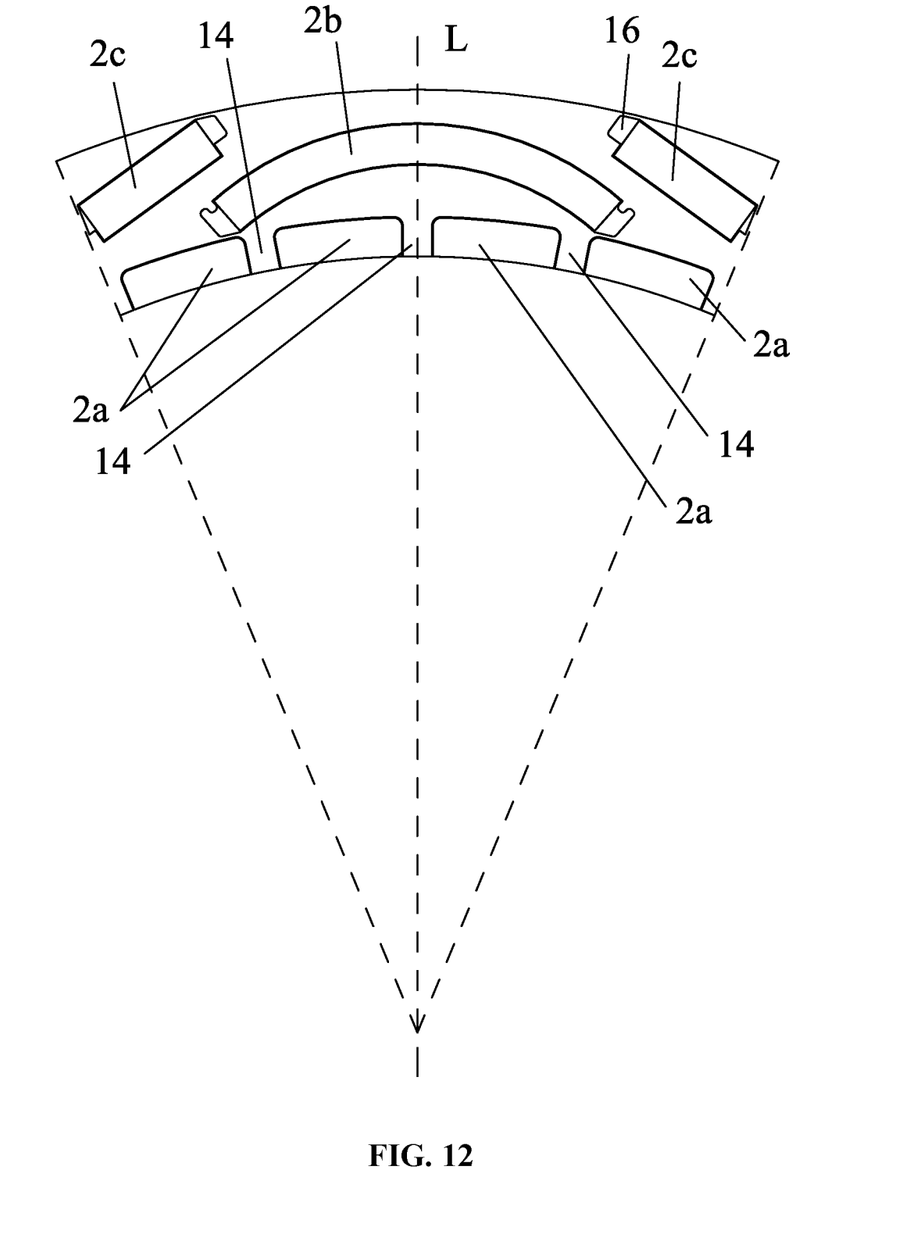
FIG. 12 is a schematic diagram of a single magnetic pole in Example 2 of the disclosure.
Figure 13:
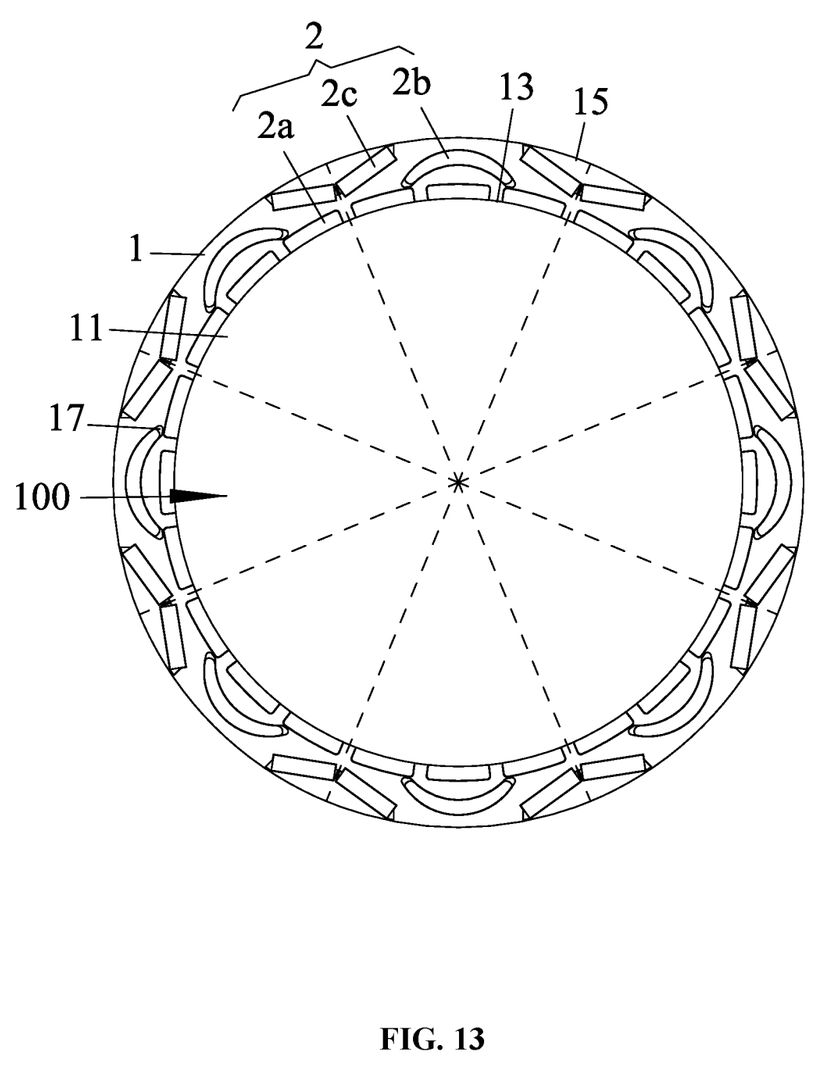
FIG. 13 is a schematic diagram of an outer rotor core and permanent magnets in Example 3 of the disclosure.
Figure 14:
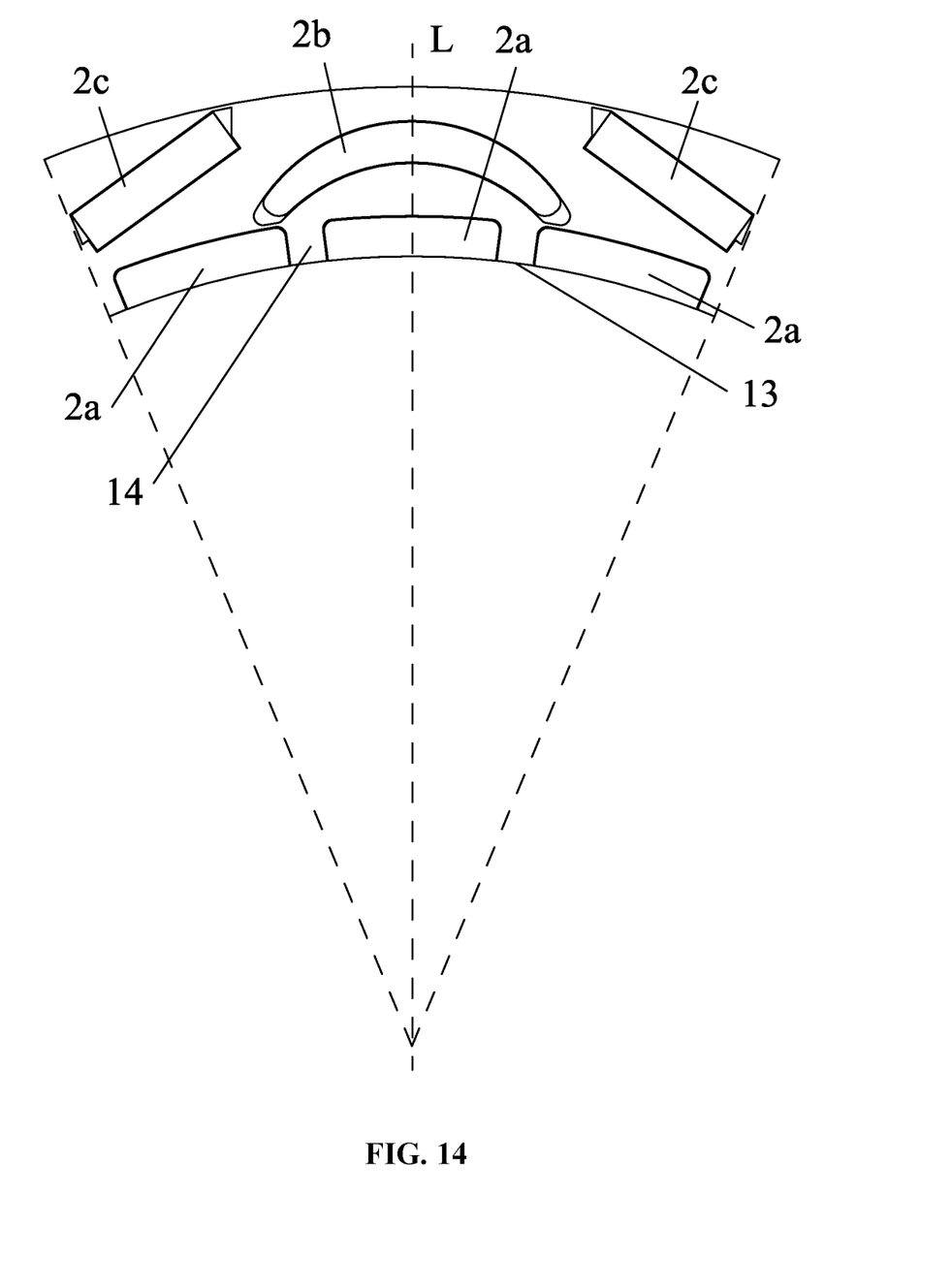
FIG. 14 is a schematic diagram of a single magnetic pole in Example 3 of the disclosure.

As shown in FIGS. 11 and 12, the example is an improvement based on example 1 with regard to the number of the first arc-shaped permanent magnet 2a. Specifically, there are four first arc-shaped permanent magnets 2a in the example, and the inner arc surface 2b1 of the second arc-shaped permanent magnet 2b covers two first arc-shaped permanent magnets 2a in the middle and three magnetic channels 14, which not only ensures a smooth magnetic path between the second arc-shaped permanent magnet 2b and the first arc-shaped permanent magnets 2a, but also improves the motor torque density, effectively utilizing rotor space and occupying less radial space.

Example 3

As shown in FIGS. 11 and 12, the example is an improvement based on example 1 with regard to the shape of the second arc-shaped permanent magnet 2b. Specifically, the second arc-shaped permanent magnet 2b is not uniform in thickness, and is thick in the middle and thin at both ends.

Example 4

A permanent magnet synchronous motor comprises a stator assembly and a permanent magnet outer rotor. The outer rotor is the outer rotor of a permanent magnet assisted synchronous reluctance motor (PMaSynRM) of example 1, 2 or 3.

It will be obvious to those skilled in the art that changes and modifications may be made, and therefore, the aim in the appended claims is to cover all such changes and modifications.

What is claimed is:

1. An outer rotor of a motor, the outer rotor comprising: an annular rotor core and a plurality of permanent magnets; wherein the annular rotor core comprises a central hole; the annular rotor core further comprises a plurality of slots, and the plurality of permanent magnets are disposed in the plurality of slots and form a plurality of magnetic poles along a circumferential direction of the rotor core;

each magnetic pole comprises three shapes of permanent magnet: a first arc-shaped permanent magnet concentric with the rotor core and having a uniform thickness, a second arc-shaped permanent magnet not concentric with the rotor core, and a rectangular permanent magnet;

in each magnetic pole, the three shapes of permanent magnet are symmetrically arranged along a center line L of the magnetic pole, and the first arc-shaped permanent magnet, the second arc-shaped permanent magnet and the rectangular permanent magnet are sequentially spaced radially from inside to outside;

an inner arc-shaped surface of the first arc-shaped permanent magnet and an inner circular sidewall of the rotor core are of equal radius and form a flush structure;

one magnetic pole comprises at least three first arc-shaped permanent magnets, one second arc-shaped permanent magnet, and two rectangular permanent magnets; the at least three first arc-shaped permanent magnets are arranged at intervals along the circumferential direction of the rotor core, and a magnetic channel is formed between every two adjacent first arc-shaped permanent magnets;

the second arc-shaped permanent magnet is located between the at least three first arc-shaped permanent magnets and the rectangular permanent magnet, and the second arc-shaped permanent magnet is not in contact with the inner circular sidewall and outer circular sidewall of the rotor core; and an inner arc surface of the second arc-shaped permanent magnet covers at least one first arc-shaped permanent magnet and at least two magnetic channels.

2. The outer rotor of claim 1, wherein each magnetic pole has a central angle $\alpha 3$, $\alpha 3 = 360°/2P$, where P is a number of pairs of the magnetic poles on the rotor core; $1.5*\alpha 3 > \alpha 1 > 0.5*\alpha 3$, and $1.5*\alpha 3 < \alpha 2 < 3*\alpha 3$, where $\alpha 1$ is an included angle between the center line L of the magnetic pole and the rectangular permanent magnet, and $\alpha 2$ is a central angle of the second arc-shaped permanent magnet.

3. The outer rotor of claim 2, wherein the included angle $\alpha 1$ between the center line L of the magnetic pole and the rectangular permanent magnet is less than 90°, and the central angle $\alpha 2$ of the second arc-shaped permanent magnet is $45° < \alpha 2 < 180°$.

4. The outer rotor of claim 3, wherein the first arc-shaped permanent magnets are three or four in number.

5. The outer rotor of claim 4, wherein the first arc-shaped permanent magnets have a thickness d, and the rotor core has a thickness D, where $0.16*D < d < 0.3*D$; a distance between two adjacent first arc-shaped permanent magnets is L1, and $0.15*D < L1 < 0.35*D$.

6. The outer rotor of claim 5, wherein a minimum distance between the second arc-shaped permanent magnet and the outer circular sidewall of the rotor core is L2, and $0.15*D < L2 < 0.35*D$.

7. The outer rotor of claim 6, wherein a minimum distance between the rectangular permanent magnet and the second arc-shaped permanent magnet is L3, and $0.15*D < L3 < 0.35*D$.

8. The outer rotor of claim 7, wherein the rotor core further comprises first auxiliary slots on both ends of the rectangular permanent magnet; a first narrow magnetic bridge is formed between one first auxiliary slot and the outer circular sidewall to reduce magnetic leakage; the rotor core further comprises second auxiliary slots on both ends of the second arc-shaped permanent magnet; a second narrow magnetic bridge is formed between one second auxiliary slot and an outer arc surface of the first arc-shaped permanent magnets to reduce magnetic leakage; and both the first auxiliary slots and the second auxiliary slots are filled with non-magnetic permeable materials.

9. The outer rotor of claim 8, wherein the second arc-shaped permanent magnet has a uniform thickness or is thick in the middle and thin at both ends.

10. The outer rotor of claim 8, wherein the first arc-shaped permanent magnet, the second arc-shaped permanent magnet, and the rectangular permanent magnet all comprise ferrite material; or, the first arc-shaped permanent magnet comprises neodymium iron boron material, and the second arc-shaped permanent magnet and the rectangular permanent magnet both comprise ferrite material.

11. A permanent magnet synchronous motor, comprising a stator assembly and the outer rotor of claim 1.

* * * * *